United States Patent [19]
Glad et al.

[11] 3,833,041
[45] Sept. 3, 1974

[54] TIRE INFLATOR

[75] Inventors: Thomas J. Glad; Willfred G. Schmidt, both of Sacremento, Calif.

[73] Assignee: Aerojet-General Corporation, El Monte, Calif.

[22] Filed: Oct. 11, 1973

[21] Appl. No.: 405,356

[52] U.S. Cl............ 152/347, 152/330 RF, 152/415
[51] Int. Cl.... B60c 21/08, B60c 23/06, B60c 17/00
[58] Field of Search .......... 152/346, 347, 348, 415, 152/330 RF

[56] References Cited
UNITED STATES PATENTS

| | | | |
|---|---|---|---|
| 2,581,736 | 1/1952 | Waber | 152/347 |
| 2,935,109 | 5/1960 | Railsback | 152/347 |
| 3,361,698 | 1/1968 | Pace | 152/347 |
| 3,563,294 | 2/1971 | Chien | 152/346 |
| 3,739,829 | 6/1973 | Powell et al. | 152/330 RF |

Primary Examiner—Drayton E. Hoffman
Attorney, Agent, or Firm—Mark C. Jacobs

[57] ABSTRACT

Apparatus and method for sealing and reinflating a tubeless tire after puncture or the like including an uncured puncture sealant material disposed in the tire casing chamber and a gas generator also disposed in the chamber and adapted to generate sufficient heat to cure the sealant material, and sufficient gas to reinflate the tire. The valve of the tire is a pressure relief valve and an igniter is provided for igniting the generator at a predetermined pressure in the chamber. In this manner, if the tire is punctured, the loss of pressure in the chamber activates the igniter which ignites the generator. The heat from the gas being generated cures the sealant material which plugs up the puncture while the gas generated inflates the tire to a desired pressure. The pressure relief valve regulates the pressure within the chamber.

13 Claims, 3 Drawing Figures

PATENTED SEP 3 1974 3,833,041
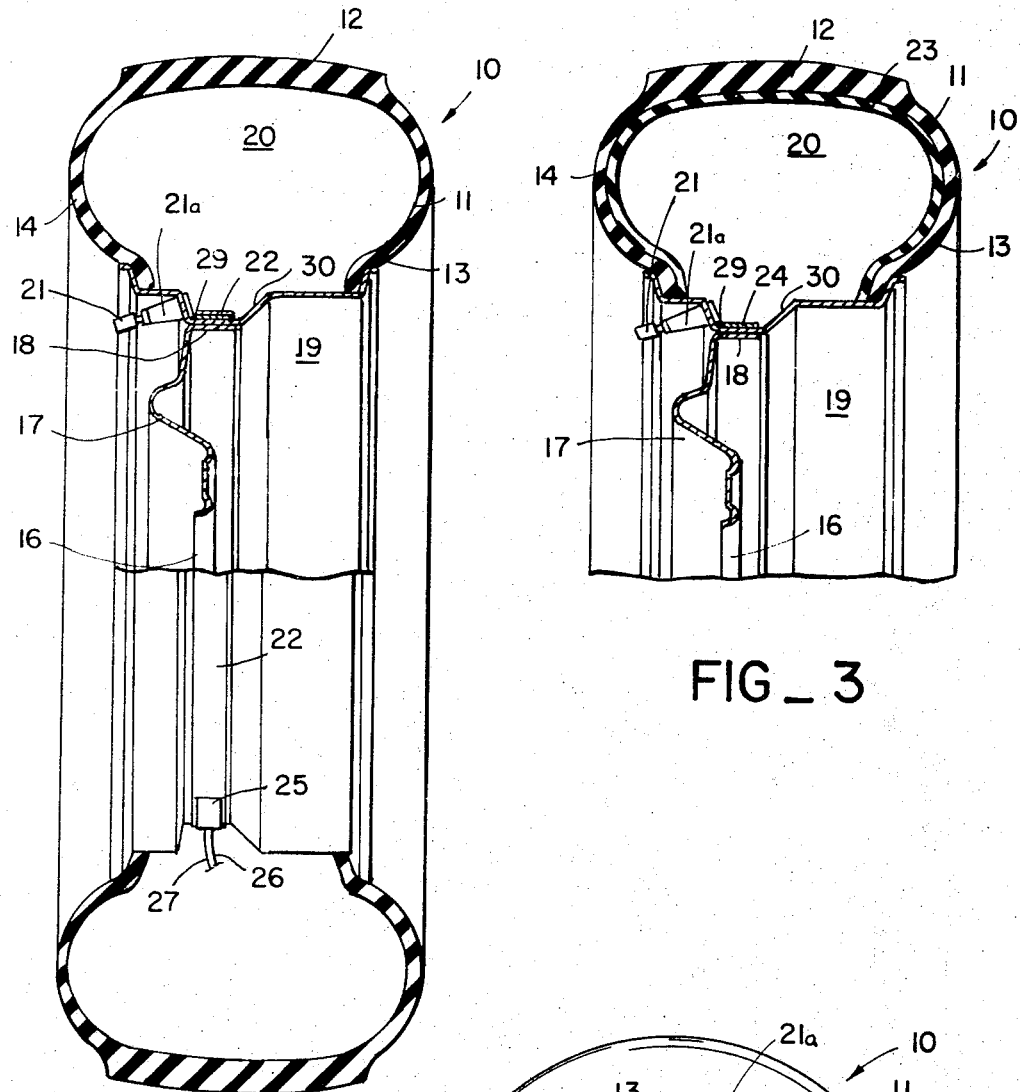
FIG_1
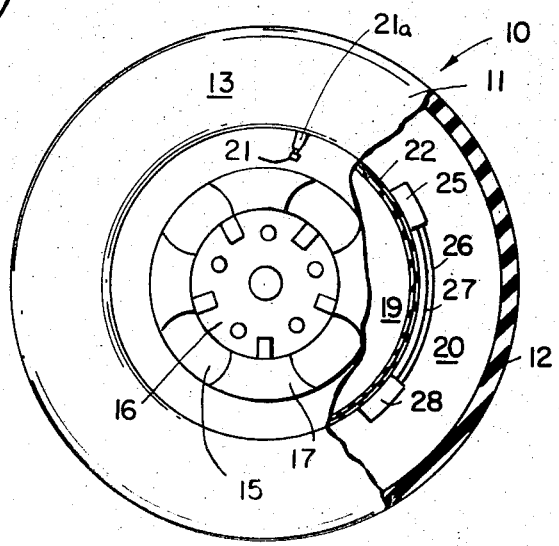
FIG_3
FIG_2

TIRE INFLATOR

BACKGROUND OF THE INVENTION

1. Field of the Invention

The invention relates to tubeless tires; and more particularly, to apparatus and method for resealing and reinflating a tubeless tire after puncture or the like.

2. Description of the Prior Art

It is usual in the automotive art to provide spare tires for vehicles or the like in case one of the tires on the vehicle is punctured or otherwise cut during use. However, it is not always convenient for many vehicle owners to change such tires. For example, elderly people, invalids, etc. find it extremely difficult if not impossible to change a tire after puncture or the like.

It is desirable therefore to have some means for both sealing a puncture or cut in a tubeless tire, then reinflating the tire to a desired pressure all while the tire is still mounted on a wheel of the vehicle. It is not necessary that such means be permanent; it is only sufficient that the tire be able to be driven for a distance sufficient for the vehicle owner to have more permanent repairs made.

SUMMARY OF THE INVENTION

It is an object of this invention to provide apparatus and method for sealing a puncture or the like in a tubeless tire while the tire is still mounted on the vehicle.

It is a further object of this invention to provide apparatus and method for reinflating the tire after sealing the puncture, also while the tire is still mounted on the vehicle.

It is still another object of this invention to provide such apparatus and method for sealing a tubeless tire after puncture or the like, then inflate the tire to a desired pressure while the tire is mounted on the vehicle and which permits the tire to be driven for a considerable distance after repair.

These and other objects are preferably accomplished by providing an uncured puncture sealant material disposed in the casing chamber of the tire and a gas generator also disposed in the chamber which is adapted to generate sufficient heat to cure the sealant material. The valve of the tire is a pressure relief valve and an igniter is provided for igniting the generator at a predetermined pressure in the chamber. In this manner, if the tire is punctured, the loss of pressure in the chamber activates the igniter which ignites the generator. The heat from the gas being generated both cures the sealant material which plugs up the puncture and inflates the tire to a desired pressure. The pressure relief valve regulates the pressure within the chamber.

BRIEF DESCRIPTION OF THE DRAWINGS

FIG. 1 is an end sectional view of a portion of a tire and associated apparatus for carrying out the techniques of our invention;

FIG. 2 is a side sectional view of a portion of the tire of FIG. 1 showing other apparatus for carrying out the techniques of our invention; and FIG. 3 is a view similar to a portion of FIG. 2 showing another embodiment of the invention.

DESCRIPTION OF THE PREFERRED EMBODIMENTS

Referring now to FIG. 1 of the drawing, a portion of a tubeless tire 10 is shown having a generally toroidal-shaped tire casing 11 which casing 11 is comprised of an annular tread portion 12 and integral sidewalls 13 and 14 as is well known in the tire art. As also seen in FIG. 2, tire 10 includes a wheel 15 having an apertured hub portion 16 and an integral web portion 17 terminating in an annular flange 18 (FIG. 1) which is secured to a rim 19. Rim 19 is secured to the sidewalls 13 and 14 of tire 10 in a fluid-tight manner thus forming a generally toroidal-shaped internal air-tight chamber 20.

The foregoing has described, aside from the valve stem as which will be discussed shortly, a conventional tubeless tire 10 which is adapted to be inflated via the valve stem and retains air within chamber 20 so that the tire 10 may be mounted on a vehicle or the like.

As particularly contemplated within the present invention, pressure relief valving means are provided for regulating the pressure of air or similar gas within chamber 20. In the exemplary embodiment, such pressure relief valving means includes a pressure relief valve 21 communicating with both the atmosphere and the interior of chamber 20 and which may be mounted on a conventional valve stem 21a. This valve 21 is adapted to open upon the generation of air or gas within chamber 20 over a predetermined amount to thereby prevent rupture of the tire casing 11 or separation from rim 19. While not necessary to the operation of the sealant means, it is deemed beneficial to include such a pressure relief valve, to prevent over inflation if accidental actuation takes place. Its presence accounts for the generation of excess gas with only total inflation taking place as the extra unneeded amount will dissipate through the valve when actuation takes place as intended, i.e., a puncture.

Also, as particularly contemplated within the present invention, sealing means are provided for sealing any cuts or punctures in tire casing 11. In the exemplary embodiment, such sealing means may comprise an annular belt or strip 22 of an uncured sealant material which may be comprised of one or more layers as shown. This strip 22 preferably extends about and thus girds the inner surface of rim 19, generally in the rim drop center thereof, within chamber 20 and may be secured or bonded to rim 19 in any suitable manner. Alternatively, as shown in FIG. 3, the sealant material may comprise a thin coating 23 which covers the entire inner wall of tire casing 11.

Again, as particularly contemplated within the present invention, gas generation means are provided for generating gas, or the like within tire chamber 20. In the exemplary embodiment, such gas generation means comprises, in the FIG. 2 embodiment, a portion of the same strip 22. That is, the strip 22 is a combination of both the sealant material and the gas generant. For example, the strip 22 may be a suitable pyrotechnic material bonded to a suitable uncured elastomeric material. In the FIG. 3 embodiment, namely, the coated inner layer embodiment, a strip 24 of a suitable pyrotechnic material may be secured about at least a portion of the inner wall of rim 19 and within chamber 20.

In both embodiments, as clearly shown in FIGS. 1 and 2, means are provided in accordance with the exemplary embodiment of the invention for igniting the gas generation material (in both embodiments, this gas generation material is either strip 24 itself or a portion of strip 22). Thus, such igniting means includes a conventional igniter 25 fixedly secured, in any suitable manner, to strip 22 (or strip 24 in the case of the FIG. 3 embodiment, only one strip—igniter arrangement being shown for convenience of illustration). As clearly shown in FIGS. 1 and 2, a pair of electrical wires or leads 26 and 27 are operatively connected to both igniter 25 and a conventional remotely actuated sensing device 28 (see FIG. 2) which may be also mounted to rim 19 (the exact location of device 28 is a matter of choice).

Sensing device 28 is adapted to send out electrical signals after detection of a predetermined pressure in the chamber 20 of tire 10. This supplies energy to igniter 25 which is activated and ignites the gas generator (either strip 22 or 24). One suitable sensing device which may be used is the Low Inflation Sensor utilized by the General Motors Corporation.

The sealant material either within strip 22 or in coating 23 is an uncured polymeric material which has been chosen such that it will cure upon the application of heat. On ignition, the gas generator provides sufficient gases to force the uncured sealant material into any holes or punctures in the wall of tire casing 11. The heat from the hot gases softens the uncured sealant material so that it flows more readily into the cuts or punctures, then cures in situ to plug the holes, cuts, punctures, or the like.

Simultaneously, the generated gas reinflates the chamber 20 of tire 10 with valve 21 venting gas to the atmosphere when the pressure within chamber 20 exceeds a desired level.

Thus, in the FIGS. 1 and 2 embodiments, the sealant material in strip 22 is distributed to any cuts, holes, punctures or the like upon the generation of the pressurizing gases. In the FIG. 3 embodiment, the pressure of the generated gases forces the sealant material in coating 23 into any cuts, holes, punctures, or the like. In both cases it is subsequently cured thus plugging these cuts, holes or punctures.

The pressure relief valve 21 provides protection against overpressurization due to inadvertent actuation of the sealant generator in a tire 10 that is already fully inflated. Also, during normal operation it allows gas to be generated in excess of that required for inflation to the desired pressure. Thus, any gas leakage during the sealing process will not degrade the final pressure in chamber 20.

The method and apparatus disclosed hereinabove is adaptable to tires of differing sizes. Also, the apparatus and method disclosed hereinabove retains the symmetry and balance of wheel 15 and does not interfere with tire mounting on typical tire mounting equipment, since the invention is located internally in the tire in the drop center.

The apparatus and method disclosed hereinabove is always present in the tire 10 even when the tire 10 is mounted on a vehicle or the like and is thus always ready for use and can be used to inflate tire 10 at anytime. Device 28 may also be operatively connected to a signalling device (not shown) such as a light, buzzer, or the like, and/or a remote control device (also not shown) operatively connected thereto for remote actuation thereof, both being mounted at a suitable convenient location on the vehicle, or in the driver compartment as on the dashboard.

A suitable gas generating means may be selected based on its rate of burning, combustion temperature and absence of unusually toxic products. Pyrotechnic organic and inorganic nitrate salts, as for example, a combination of 5-amino-tetrazole nitrate and ammonium nitrate will generate gases that are nontoxic, i.e., a mixture of nitrogen and carbon dioxide. The amount of carbon monoxide is negligible. Certain perchlorate salts can also be utilized; with particular nitrate and perchlorate salts, it may be desirable to use a catalyst to achieve a desired burning rate. Additionally, if the sealant material is a coating, as is coating 23 in FIG. 3, the gas generated may include an added ingredient, such as a catalyst, curing agent, etc., to cure the coating 23 and seal the puncture.

The uncured coating 23 sealant material may be any nonflowing suitable elastomeric material which is easily adhered to the tire inner surface. If in strip form, it may be a compacted powder or solid compacted pellets. If the strip also contains the gas generating means, a suitable binder holding the gas generant and sealant material in strip form may be used. Although strips 22 and 24 have been disclosed as being bonded to the inside of rim 19, these strips may be elastic enough to snap in place as for example, in the bottom 29 of channel 30 formed in rim 19 as shown in FIGS. 1 and 3.

The igniting means, such as igniter 25, may comprise one or more such igniters usually of a high energy short duration nature patched at spaced locations onto the outer surface of strips 22, 24. Any suitable igniting means, such as Hercules S-26 BO squibs may be used. Such squibs and the like are known to the art.

In addition to the foregoing, the sealant material need not be a coating or a strip secured in place on the rim 19 of tire 10 but may be disposed freely within chamber 20. This material thus would be pushed into the cuts or puncture by the pressure of the generated gas. For example, light fibrous materials of various shapes and dimensions may be so used.

Another free floating material that may be used is a viscous polymeric material, such as butyl rubber. This material may also be introduced into chamber 20 from a pressurized container using the inflating gas as a carrier for the sealant material. In both cases, the escaping gas brings the polymeric material to the cut or puncture which results in a seal.

Although the sealing means disclosed hereinabove is not a "permanent" repair, the sealant will allow the tire to be reinflated and the vehicle driven, at about 50 m.p.h., for at least 50 miles. This is desirable from a safety standpoint as it insures that the driver will, after a short time, have to get the tire inspected and properly repaired. That is, while it allows the driver to continue his journey to a relatively safer location, it still requires him to have the tire properly repaired and inspected prior to permanent reuse.

It is to be understood that while the apparatus and method herein described constitute preferred and/or exemplified embodiments of the invention the invention is not to be limited thereto for it will be evident to those skilled in the art that numerous changes and modifications may be made in the details involved without departing from the scope and spirit of our invention, which is to be construed as broadly as the following claims may allow.

We claim:

1. Apparatus for sealing and reinflating a tubeless tire after puncture or the like wherein said tire is comprised of a generally toroid-shaped tire casing comprised of an annular tread portion having sidewalls integral therewith, said casing being generally U-shaped in cross-section and said tire further comprised of a wheel having an apertured hub portion and a web portion integral with the hub portion, and an annular rim integral with the web portion and fixedly secured to the sidewalls of said casing in a fluid-tight manner forming an inner chamber sealed from the atmosphere, and a valve stem in fluid communication with both the interior of said chamber and the atmosphere mounted in said rim, said apparatus comprising:

uncured puncture sealant means associated with the interior of said chamber adapted to being cured upon the application of heat;

gas generating means associated with the interior of said chamber adapted to generate a gas having a temperature sufficient to cure said sealant means;

igniting means associated with the interior of said chamber adapted to ignite said gas generating means to thereby generate said gas; and sensing means associated with the interior of said chamber operatively connected to said igniting means and responsive to the pressure within said chamber to ignite said igniting means upon the sensing of a predetermined pressure within said chamber.

2. The apparatus of claim 1 further including pressure relief means associated with said valve for relieving pressure in the interior of said chamber.

3. The apparatus of claim 1 wherein the sealant means is a strip of an elastomeric material extending about the rim of said tire within said chamber.

4. The apparatus of claim 2 wherein said gas generating means is bonded to the strip of elastomeric material.

5. The apparatus of claim 1 wherein said igniting means is a pyrotechnic material operatively connected to said gas generating means.

6. The apparatus of claim 1 wherein the sealant means is a coating on substantially the entire interior wall of said casing.

7. The apparatus of claim 5 wherein said gas generating means is an annular strip extending about the rim of said tire within said chamber.

8. The apparatus of claim 1 wherein said sensing means is a remotely actuated sensing device.

9. The apparatus of claim 1 wherein said wheel is symmetrically balanced about an axis extending centrally through the aperture of said hub portion.

10. A method for sealing and reinflating a tubeless tire after puncture or the like wherein said tire is comprised of a generally toroid-shaped tire casing comprised of an annular tread portion having sidewalls integral therewith, said casing being generally U-shaped in cross-section and said tire further comprised of a wheel having an apertured hub portion and a web portion integral with the hub portion, and an annular rim integral with the web portion and fixedly secured to the sidewalls of said casing in a fluid-tight manner forming an inner chamber sealed from the atmosphere, a valve stem in fluid communication with both the interior of said chamber and the atmosphere mounted in said rim, and an uncured sealant material disposed in said chamber, said method comprising the steps of:

sensing the pressure of air within said chamber;

generating a heated gas within said chamber after the sensing of a predetermined pressure within said chamber;

flowing said sealant material into any punctures or the like in said tire casing by the generation of said gas;

curing said sealant material in situ within said chamber; and continuing the generation of said gas within said chamber until the pressure therein reaches a predetermined pressure.

11. The method of claim 10 further including the step of valving to the atmosphere the gas within said chamber when said predetermined pressure is reached in said chamber.

12. Apparatus for resealing and reinflating a tubeless tire after puncture or the like wherein said tire is comprised of a generally toroid-shaped tire casing comprised of an annular tread portion having sidewalls integral therewith, said casing being generally U-shaped in cross-section and said tire further comprised of a wheel having an apertured hub portion and a web portion integral with the hub portion, and an annular rim integral with the web portion and fixedly secured to the sidewalls of said casing in a fluid-tight manner forming an inner chamber sealed from the atmosphere, a valve stem in fluid communication with both the inerior of said chamber and the atomsphere mounted in said rim, said apparatus comprising:

puncture sealant means associated with the interior of said chamber adapted to seal any punctures in said casing upon entry therein;

gas generating means associated with the interior of said chamber adapted to generate sufficient gas within said chamber to force said sealant means into said punctures;

igniting means associated with the interior of said chamber adapted to ignite said gas generating means to thereby generate said gas at a predetermined pressure within said chamber; and sensing means associated with the interior of said chamber operatively connected to said igniting means and responsive to the pressure within said chamber to ignite said igniting means upon the sensing of a predetermined pressure within said chamber.

13. The apparatus of claim 12 further including pressure relief means associated with said valve for relieving pressure in the interior of said chamber.

* * * * *